US008943589B2

(12) United States Patent
Amit et al.

(10) Patent No.: US 8,943,589 B2
(45) Date of Patent: *Jan. 27, 2015

(54) APPLICATION TESTING SYSTEM AND METHOD

(71) Applicant: International Business Machines Corporation, Armonk, NY (US)

(72) Inventors: Yair Amit, Tel-Aviv (IL); Adi Cohen, Tel-Aviv (IL); Lotem Guy, Hod Hasharon (IL); Alexander Landau, Karmiel (IL); Omer Tripp, Har-Adar (IL); Avishai Vana, Netanya (IL); Omri Weisman, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 55 days.

This patent is subject to a terminal disclaimer.

(21) Appl. No.: 13/693,275

(22) Filed: Dec. 4, 2012

(65) Prior Publication Data

US 2014/0157406 A1 Jun. 5, 2014

(51) Int. Cl.
*G06F 21/00* (2013.01)
*H04L 29/06* (2006.01)
(Continued)

(52) U.S. Cl.
CPC ........ *H04L 63/1416* (2013.01); *H04L 63/0245* (2013.01); *H04L 63/1433* (2013.01); *H04L 27/2681* (2013.01); *H04L 1/008* (2013.01); *H04L 5/0044* (2013.01)
USPC ............... 726/22; 726/1; 726/25; 709/206; 709/217; 370/506

(58) Field of Classification Search
CPC ... H04L 1/008; H04L 5/0044; H04L 63/0245; H04L 27/2681; H04L 9/3213
USPC ............ 726/1, 25, 22; 709/206, 217; 370/506
See application file for complete search history.

(56) References Cited

U.S. PATENT DOCUMENTS 8,087,088 B1 12/2011 Pennington et al.
8,141,158 B2 3/2012 Calendino et al.
(Continued)

FOREIGN PATENT DOCUMENTS

WO 2012/010394 A1 1/2012

OTHER PUBLICATIONS

Artzi, S.. et al; "Finding Bugs in Web Applications Using Dynamic Test Generation and Explicit-State Model Checking";Software Engineering, IEEE Transactions on vol. 36 , Issue: 4; DOI: 10.1109/TSE.2010.31; Publication Year: 2010 , pp. 474-494.*

Noirie, Ludovic, et al;"Semantic networking: Flow-based, traffic-aware, and self-managed networking"; Bell Labs Technical Journal vol. 14 , Issue: 2; DOI: 10.1002/bltj.20371; Publication Year: 2009 , pp. 23-38.*

(Continued)

*Primary Examiner* — Hadi Armouche
*Assistant Examiner* — Angela Holmes
(74) *Attorney, Agent, or Firm* — Holland & Knight LLP; Brian J. Colandreo, Esq.; Jeffrey T. Placker, Esq.

(57) ABSTRACT

A method, computer program product, and computer system for sending, by a first computing device, a payload from a plurality of payloads to a second computing device. A response from the second computing device responding to the payload is received at the first computing device. It is determined whether the payload has successfully attacked an application executing at the second computing device based upon, at least in part, the response. If not, at least a portion of the plurality of payloads that shares a structural overlap with the first payload is identified. At least a second payload of the portion is prevented from being sent to the second computing device in response to identifying that the second payload shares the structural overlap with the first payload.

12 Claims, 5 Drawing Sheets

(51) Int. Cl.
*H04L 27/26* (2006.01)
*H04L 1/00* (2006.01)
*H04L 5/00* (2006.01)

(56) References Cited

U.S. PATENT DOCUMENTS

| | | |
|---|---|---|
| 8,146,135 B2 | 3/2012 | Waissbein et al. |
| 2005/0281291 A1* | 12/2005 | Stolfo et al. ............. 370/506 |
| 2009/0070459 A1* | 3/2009 | Cho et al. .................. 709/224 |
| 2009/0100518 A1* | 4/2009 | Overcash .................... 726/22 |
| 2010/0050263 A1 | 2/2010 | Weisman |

OTHER PUBLICATIONS

Wassermann et al., "Dynamic Test Input Generation for Web Applications," ISSTA '08, Jul. 20-24, 2008, pp. 249-259.

x5s Web Security Testing Tool for Fiddler, http://udm4.com/Windows/x5s_Web_Security_Tes-193105, downloaded on Nov. 15, 2012, pp. 1-2.

Cheema et al., "Comparative Evaluation of Header vs. Payload Based Network Anomaly Detectors," ISBN: 978-988-17012-5-1, Jul. 1-3, 2009, pp. 1-5.

* cited by examiner

APPLICATION TESTING SYSTEM AND METHOD

TECHNICAL FIELD

This disclosure relates to application testing systems and methods.

BACKGROUND

Some applications, such as web applications, may be subjected to attacks by, e.g., hackers. For instance, injection attacks may be used to attack web applications. An example of an injection attack may include cross-site scripting (XSS)—a vulnerability that may allow attackers to bypass a client-side security mechanism and gain elevated access-privileges to sensitive information.

Security scanners, such as a dynamic, automated web application security scanner, may be used to identify XSS vulnerabilities, as well as other injection vulnerabilities (e.g., command injection). However, the scale of some web applications is increasing, both in number of pages and in functionality. For instance, some web applications may consist of numerous pages (e.g., thousands), each defining numerous parameters (e.g., tens or hundreds). Each test payload sent by the security scanner targeting an individual parameter may translate into, e.g., Hypertext Transfer Protocol (HTTP) traffic, which may be expensive compared to other, in-memory computations.

Moreover, the number of possible ways to exploit XSS alone may be large, and commercial black-box scanners may be equipped with a specification of merely several dozen injection attacks. Thus, the coverage of existing security scanners is typically poor, as only a small, fixed number of tests are generally sent for each parameter to guarantee reasonable overall scanning time. For example, the attempted payloads are typically those that are deemed by a security expert to be the most prevalent attack payloads. As such, some scanners may, e.g., leave open many security holes, provide a false sense of security, and encourage attackers to attempt less obvious payloads than those likely selected by the security expert.

SUMMARY OF DISCLOSURE

In one implementation, a method, performed by one or more computing devices, comprises sending, by a first computing device, a payload from a plurality of payloads to a second computing device. A response from the second computing device responding to the payload is received at the first computing device. The payload is determined to have successfully attacked an application executing at the second computing device based upon, at least in part, the response. At least a portion of the plurality of payloads that shares a structural overlap with the first payload is identified. At least a second payload of the portion is prevented from being sent to the second computing device in response to identifying that the second payload shares the structural overlap with the first payload.

One or more of the following features may be included. The structural overlap may include a token. Preventing at least the second payload of the portion from being sent to the second computing device may include adjusting a priority of at least the second payload. A grammar for generating the plurality of payloads may be selected. A data structure may be generated to model the structural overlap of at least the second payload with the first payload. The data structure may include a weighted edge label associated with the structural overlap of at least the second payload with the first payload. The successful attack may include a cross-site scripting attack.

In another implementation, a computing system includes a processor and a memory configured to perform operations comprising sending, by a first computing device, a payload from a plurality of payloads to a second computing device. A response from the second computing device responding to the payload is received at the first computing device. The payload is determined to have successfully attacked an application executing at the second computing device based upon, at least in part, the response. At least a portion of the plurality of payloads that shares a structural overlap with the first payload is identified. At least a second payload of the portion is prevented from being sent to the second computing device in response to identifying that the second payload shares the structural overlap with the first payload.

One or more of the following features may be included. The structural overlap may include a token. Preventing at least the second payload of the portion from being sent to the second computing device may include adjusting a priority of at least the second payload. A grammar for generating the plurality of payloads may be selected. A data structure may be generated to model the structural overlap of at least the second payload with the first payload. The data structure may include a weighted edge label associated with the structural overlap of at least the second payload with the first payload. The successful attack may include a cross-site scripting attack.

In another implementation, a computer program product resides on a computer readable storage medium that has a plurality of instructions stored on it. When executed by a processor, the instructions cause the processor to perform operations comprising sending, by a first computing device, a payload from a plurality of payloads to a second computing device. A response from the second computing device responding to the payload is received at the first computing device. The payload is determined to have successfully attacked an application executing at the second computing device based upon, at least in part, the response. At least a portion of the plurality of payloads that shares a structural overlap with the first payload is identified. At least a second payload of the portion is prevented from being sent to the second computing device in response to identifying that the second payload shares the structural overlap with the first payload.

One or more of the following features may be included. The structural overlap may include a token. Preventing at least the second payload of the portion from being sent to the second computing device may include adjusting a priority of at least the second payload. A grammar for generating the plurality of payloads may be selected. A data structure may be generated to model the structural overlap of at least the second payload with the first payload. The data structure may include a weighted edge label associated with the structural overlap of at least the second payload with the first payload. The successful attack may include a cross-site scripting attack.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF ONE OR MORE IMPLEMENTATIONS

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
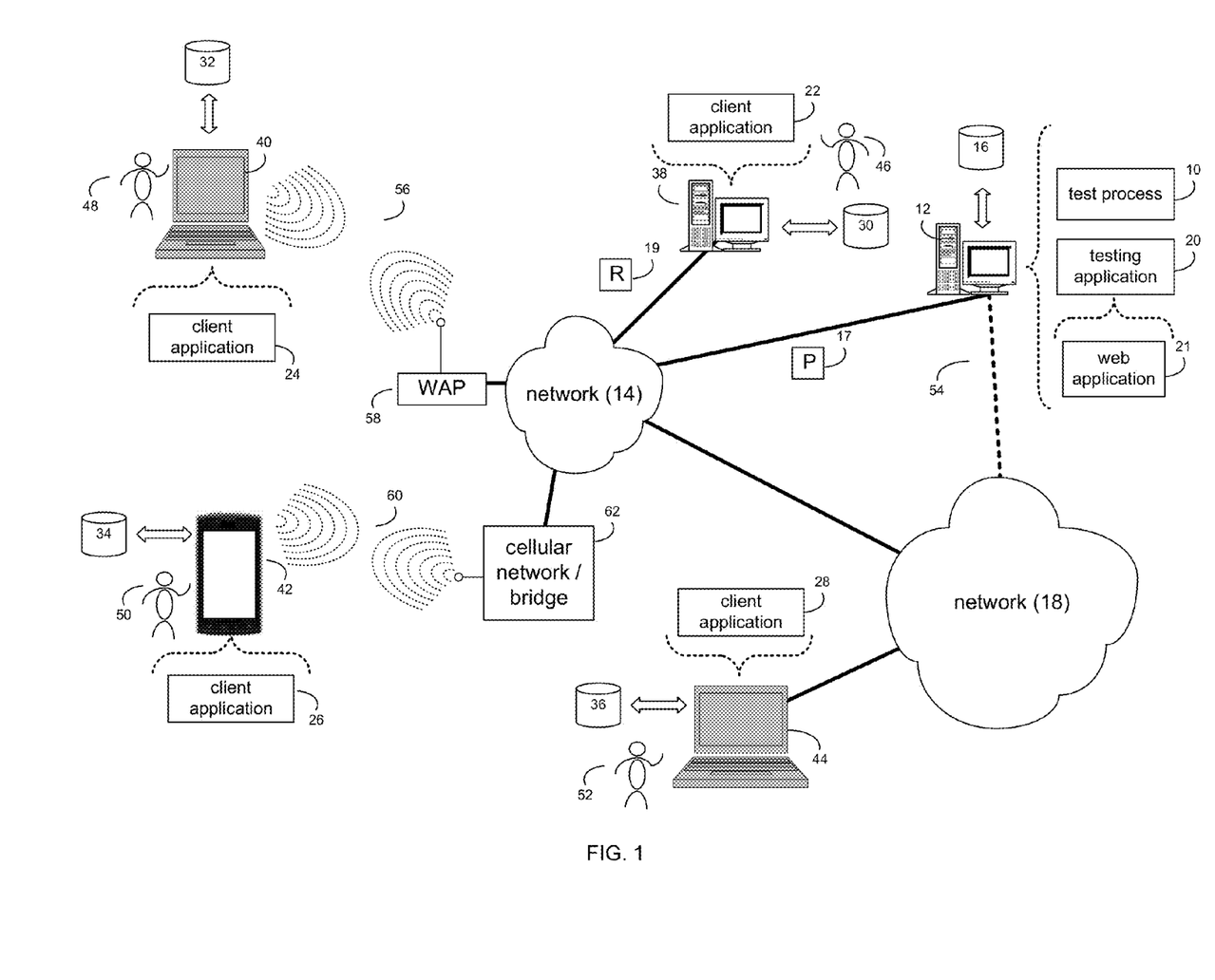
FIG. 1 is an illustrative diagrammatic view of a test process coupled to a distributed computing network according to one or more implementations of the present disclosure.

Referring to FIG. 1, there is shown test process 10 that may reside on and may be executed by a computer (e.g., computer 12), which may be connected to a network (e.g., network 14) (e.g., the internet or a local area network). Examples of computer 12 may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to Microsoft® Windows®; Mac® OS X® Red Hat® Linux®, or a custom operating system, for example. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, test process 10 may send, by a first computing device, a payload (e.g., payload 17) from a plurality of payloads to a second computing device. A response (e.g., response 19) from the second computing device responding to the payload may be received at the first computing device. The payload may be determined to have successfully attacked an application executing at the second computing device based upon, at least in part, the response. At least a portion of the plurality of payloads that shares a structural overlap with the first payload may be identified. At least a second payload of the portion may be prevented from being sent to the second computing device in response to identifying that the second payload shares the structural overlap with the first payload.

The instruction sets and subroutines of test process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, etc.) and may be located within any suitable memory location, such as storage device 16 coupled to computer 12. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Test process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a testing application (e.g., testing application 20), examples of which may include, but are not limited to, e.g., a security testing application (e.g., security scanner application), at least a portion of an application (e.g., web application 21) to be tested, or any application that allows for the testing of applications. Those skilled in the art will appreciate that web application 21 that is to be tested via test process 10 and/or testing application 20 may be separate from, e.g., testing application 20. Test process 10 and/or testing application 20 may be accessed via client applications 22, 24, 26, 28. Test process 10 may be a stand alone application, or may be an applet/application/script that may interact with and/or be executed within testing application 20. Examples of client applications 22, 24, 26, 28 may include but are not limited to, e.g., a security testing application (e.g., security scanner application), at least a portion of an application (e.g., web application 21) to be tested, or any application that allows for the testing of applications, a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a scanner (e.g., security scanner) (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to Android™, Apple® iOS®, Mac® OS X®; Red Hat® Linux®, or a custom operating system.

One or more of client applications 22, 24, 26, 28 may be configured to effectuate some or all of the functionality of test process 10 (and vice versa). Accordingly, test process 10 may be a purely server-side application, a purely client-side application, or a hybrid server-side/client-side application that is cooperatively executed by one or more of client applications 22, 24, 26, 28 and test process 10.

One or more of client applications 22, 24, 26, 28 may be configured to effectuate some or all of the functionality of testing application 20 (and vice versa). Accordingly, testing application 20 may be a purely server-side application, a purely client-side application, or a hybrid server-side/client-side application that is cooperatively executed by one or more of client applications 22, 24, 26, 28 and testing application 20.

Users 46, 48, 50, 52 may access computer 12 and test process 10 directly through network 14 or through secondary network 18. Further, computer 12 may be connected to network 14 through secondary network 18, as illustrated with phantom link line 54. Test process 10 may include one or more user interfaces, such as browsers and textual or graphical user interfaces, through which users 46, 48, 50, 52 may access test process 10.

The various client electronic devices may be directly or indirectly coupled to network 14 (or network 18). For example, client electronic device 38 is shown directly coupled to network 14 via a hardwired network connection.

Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth™ is a telecommunications industry specification that allows, e.g., mobile phones, computers, smart phones, and other electronic devices to be interconnected using a short-range wireless connection.

Figure 2:
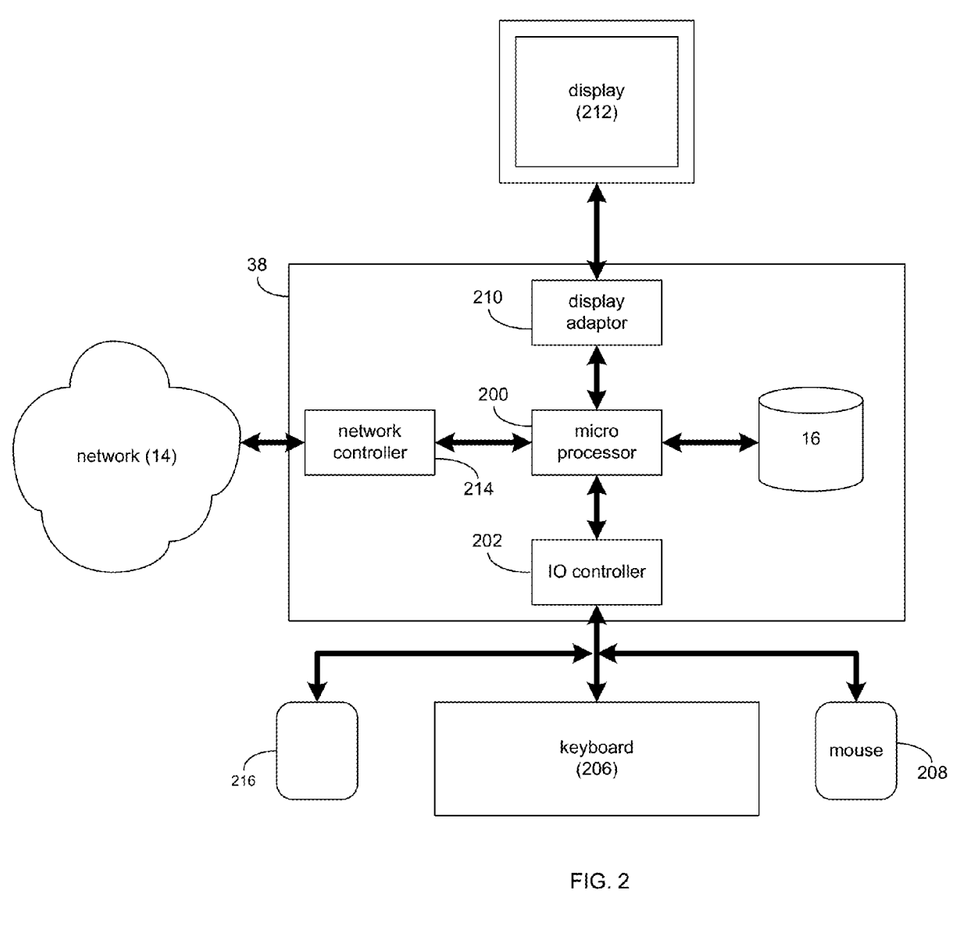
FIG. 2 is a diagrammatic view of the computer of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configuration are possible. For example, any computing device capable of executing, in whole or in part, test process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device 16. An I/O controller (e.g., I/O controller 202) may be configured to couple microprocessor 200 with various devices, such as keyboard 206, pointing/selecting device (e.g., mouse 208), custom device (e.g., scanner 216), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Test Process:

As discussed above and referring also to FIGS. 3-5, test process 10 may send 300, by a first computing device, a payload from a plurality of payloads to a second computing device. A response from the second computing device responding to the payload may be received 302 by test process 10 at the first computing device. The payload may be determined 304 by test process 10 to have successfully attacked an application executing at the second computing device based upon, at least in part, the response. At least a portion of the plurality of payloads that shares a structural overlap with the first payload may be identified 306 by test process 10. At least a second payload of the portion may be prevented 308 by test process 10 from being sent to the second computing device in response to test process 10 identifying 306 that the second payload shares the structural overlap with the first payload.

Figure 3:
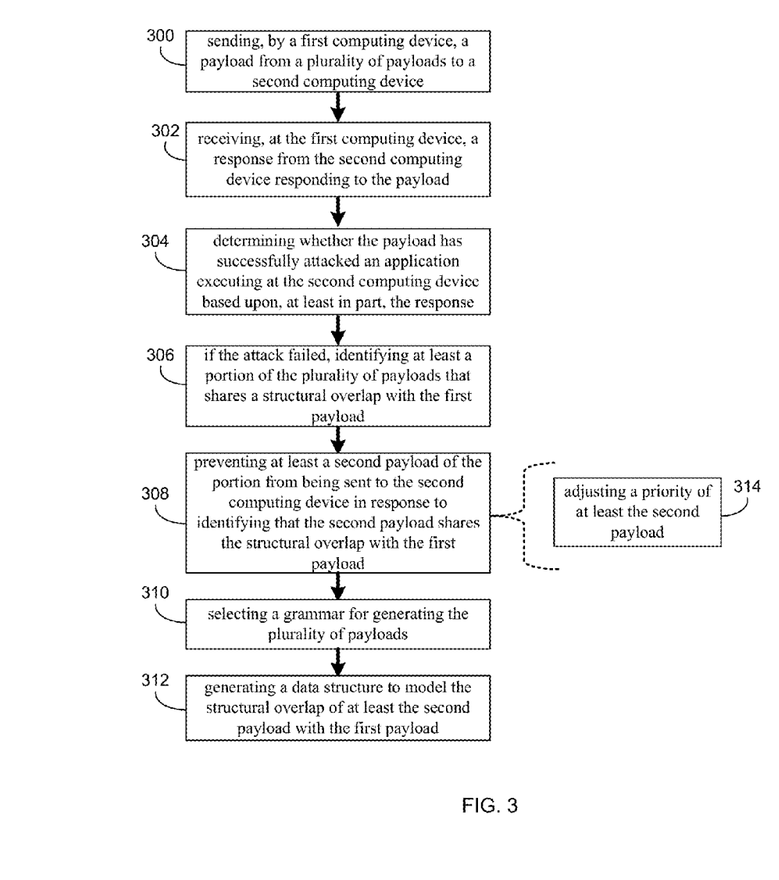
FIG. 3 is an illustrative flowchart of the test process of FIG. 1 according to one or more implementations of the present disclosure.

For instance, assume for example purposes only that a user (e.g., user 46) wants to test an application (e.g., web application 21) for, e.g., security vulnerabilities. One example of a potential security vulnerability to test for may include an injection attack, which may include, e.g., cross-site scripting (XSS) and command injection. In the example, test process 10 may (e.g., via client application 22) send 300, by a first computing device (e.g., client electronic device 38), a payload (e.g., payload 17) from a plurality of payloads to a second computing device (e.g., computer 12) that may be executing web application 21. The plurality of payloads may include payloads that may be utilized to test for, e.g., variations of the above-noted vulnerabilities, as well as other vulnerabilities that may be present in web application 21.

For instance, two example payloads may include:
payload 17: <script>alert('XSS')</script.
payload n: <img src="nosource" onerror="alert('XSS')"/>

Web application 21 may (e.g., via test process 10) receive and execute at least a portion of payload 17, which may result in a response being generated (e.g., via web application 21 and/or test process 10). The response (e.g., response 19) from computer 12 responding to payload 17 may be received 302 by test process 10 (e.g., via client application 22 and/or testing application 20) at client electronic device 38. Further assume for example purposes only that when payload 17 is sent 300 to computer 12, response 19 received 302 by test process 10 is <script>('XSS')</script>. This may suggest that code (e.g., server-side code) of computer 12 sanitizes the "alert" substring, which may be confirmed, e.g., by sending the more specific payload:
payload z: alert In some implementations, payload 17 may be determined 304 by test process 10 (e.g., via testing application 20 and/or client application 22) to have successfully attacked an application (e.g., web application 21) executing at computer 12 based upon, at least in part, response 19. In some implementations, for example, it may be determined 304 that response 19 may allow for a successful attack, which may include the above-described XSS attack, where attackers may bypass a client-side security mechanism (e.g., of client electronic device 38) and may gain elevated access-privileges to (sensitive) information.

Assume for example purposes only that there is a set of tests T of size $N_T$ for a specific security vulnerability (e.g., XSS). For each test (that may include one or more of the above-described payloads), test process 10 may hold a collection of constraints to which the test may require web application 21 to conform (e.g., without them the test may fail).

Further assume that test process 10 may hold a collection of constraints to which web application 21 conforms and a list of constraints to which web application 21 does not conform (e.g., initialized as an empty collection). In the example, test process 10 may, for some or all of the tests, check if there is a constraint that the test requires, but to which web application 21 does not conform. If not, test process 10 may send the test and return true if the test succeeds. If the test fails, test process 10 may send, e.g., a constraint-request, in order to discover a new constraint that the test may require, but to which web application 21 does not conform.

The process may stop when a test succeeds or when no tests are left in the test set collection. Example pseudo code executed by test process 10 may include:
1. Define T as the set of tests (size $N_T$)
2. For each t in T, define $C^t$ as a collection of constraints to which t obeys.

3. Define ACN as a collection of constraints to which web application 21 does not obey.
4. Define ACP as a collection of constraints to which web application 21 does obey.
5. For each t in T:
  a. If the intersection of $C^t$ and ACN is not empty:
    i. Continue (go to 5)
  b. Send test request t and receive response $R^t$ from computer 12
  c. If $R^t$ is vulnerable:
    i. Return True and finish
  d. For each constraint c in $C^t$:
    i. If c is in ACP:
      1. Continue (go to 5.d)
    ii. Send constraint request c and receive response $R^c$ from computer 12
    iii. If $R^c$ obeys to constraint c:
      1. Add c to ACP
      2. Continue (go to 5.d)
    iv. Else:
      1. Add constraint c to collection ACN
      2. Break loop 5.d (go to 5)
6. Return False and finish The logic of computer 12 may process payloads according to some pre-determined rules (e.g., sanitizers and validators), which may enable effective learning by test process 10 across a plurality of payloads without requiring that all of the plurality of possible payloads be sent. For example, in some implementations, let T be the group of tests and let C be the group of constraints. In the example, assume the size of T is $N_T$ and the size of C is $N_C$. Test process 10 may choose the group C such that for each constraint c in C, about 10% of the tests in T obey the constraint c.

In Some implementations, test process 10 may find the number of constraints needed in order to disqualify some or all tests in T (e.g., or all tests except 1).

For example:

$$N_T * 0.9^x < 1$$

$$\log(N_T) + x * \log(0.9) < \log(1) = 0$$

$$x < \log(N_T)/\log(9) < \log(N_T)$$

In the example, by finding $\log(N_T)$ constraints, test process 10 may be left with 1 test in T. In some implementations, test process 10 may test constraints that are relevant to a test that did not succeed; therefore, there may be a reason to assume test process 10 may find a constraint with high probability ($p_c$).

Thus, the average number of requests that test process may send 300 until finding a new constraint may be $1/p_c$, the total number of constraint requests may be $\log(N_T)/p_c$, and the number of test requests may be $\log(N_T)$, hence, the total number of requests may be $\log(N_T) + \log(N_T)/p_c$.

For example, assume a test set T of size 10 k ($N_T$=10,000). Further assume the probability to find a constraint is 0.2 ($p_c$=0.2), test process 10 may only need 24 requests to go over, e.g., the whole test space of XSS attacks, which may be a reasonable number of requests for, e.g., scanner 216 coupled to client electronic device 38 and associated with client application 22 and/or testing application 20 and/or test process 10. That is, $\log(N_T) + \log(N_T)/p_c \rightarrow 4 + 4/0.2 = 24$.

Thus, it may be possible to enlarge the size of the test space, e.g., in three orders of magnitude without unduly increasing the number of payloads sent by test process 10. For example, in some implementations, if it is known that an attack with an "alert" token will be successful for a XSS attack, then it may be assumed that each payload that shares the structural overlap of the "alert" token will also be successful for the XSS attack. Thus, it may not be necessary for test process 10 to send other payloads that share the structural overlap of the "alert" token. This may result in the ability of test process 10 to test against a larger test space without unduly increasing the number of payloads sent by test process 10.

In some implementations, no constraint may be found, which may results in a large number of requests that, e.g., scanner 216 may need to send. However, test process 10 may implement a naïve approach in this situation to overcome the need for a large number of requests.

Continuing with the above example, at least a portion of the plurality of payloads that shares a structural overlap with payload 17 may be identified 306 by test process 10 (e.g., via testing application 20 and/or client application 22). The structural overlap may include, e.g., a token. For instance, the token or above-described terminal (e.g., "alert") may be common to payload 17 and payload n noted above. Those skilled in the art will appreciate that other types of structural overlaps may also exist, thus, the description of the structural overlap including a token should be taken as an example only and not to otherwise limit the scope of the disclosure.

Figure 4:
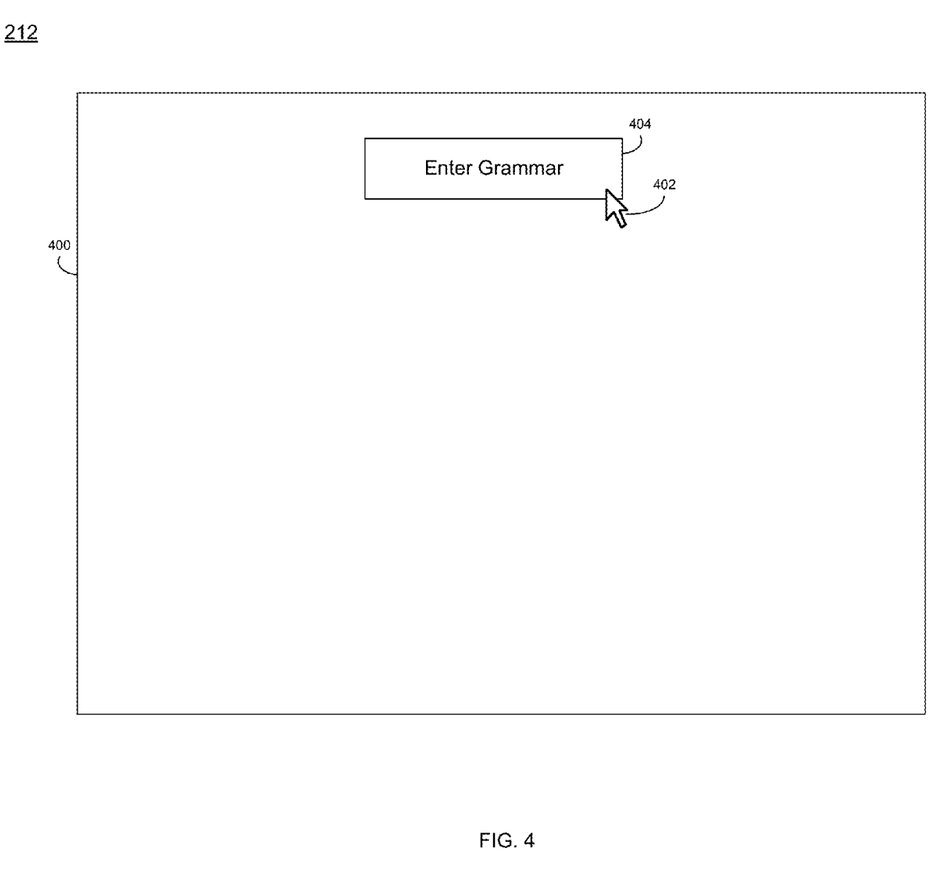
FIG. 4 is an illustrative diagrammatic view of a screen image displayed by the test process of FIG. 1 according to one or more implementations of the present disclosure.

In some implementations, the structural overlap may be identified 306 using, e.g., two data structures. For example, one data structure may include a grammar that may be selected 310 by test process 10 for generating the above-noted plurality of payloads. The grammar may enable compact, declarative specification of production rules for at least a portion of the plurality of payloads. The ability to encode the space of possible attacks as a grammar may demonstrate that there is a high degree of structural overlap across different tests. In some implementations, the grammar may be selected 310 via a user interface 400 on display 212 of client electronic device 38 (e.g., via test process 10 and/or client application 22). For example, user 46 may, e.g., via curser 402 of mouse 208, select an object 404 of user interface 400 that may receive the grammar to generate the above-noted plurality of payloads. Additionally/alternatively, the grammar may be selected automatically by test process 10 (e.g., via client application 22).

Figure 5:
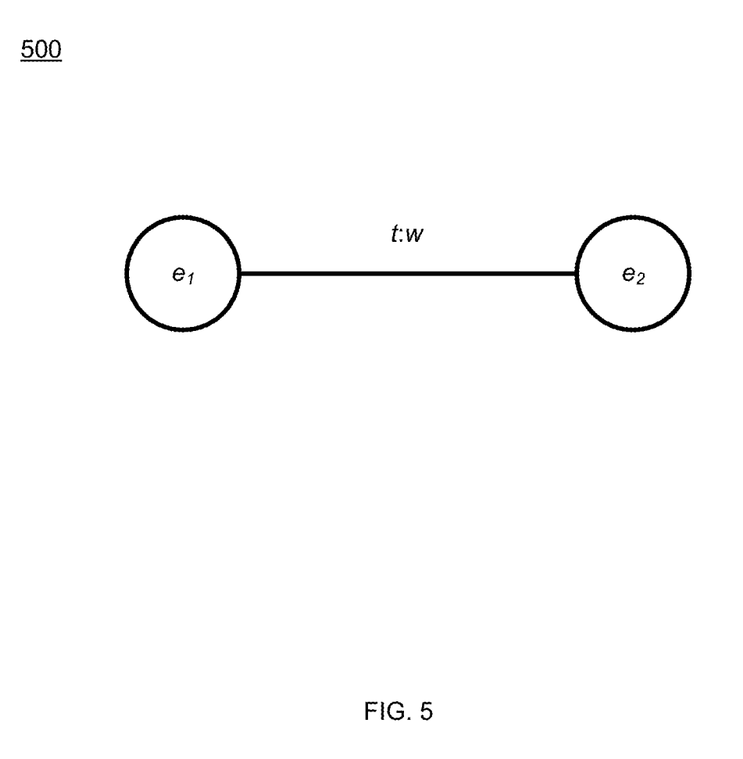
FIG. 5 is an illustrative graph according to one or more implementations of the present disclosure.

Another example data structure may include a graph-like data structure (e.g., propagation graph 500) that may be generated 312 by test process 10 to model the structural connections between distinct payloads (e.g., the structural overlap of at least the first payload (e.g., payload 17) and a second payload from the plurality of payloads.

In some implementations, test process 10 may load some or all of the above-noted expressions generated by the grammar into propagation graph 500. In some implementations, the data structure (e.g., propagation graph 500) may include a weighted edge label associated with the structural overlap of at least the second payload with payload 17. For example, each expression may be assigned an initial weight by test process 10 that reflects its baseline priority (e.g., as a function of the frequency of the terminals the expression may include). For each pair of expressions $e_1$ and $e_2$ and terminal t contained in both $e_1$ and $e_2$, there may be an undirected, labeled edge in the propagation graph connected between $e_1$ and $e_2$. As shown in example FIG. 5, the edge label is t:w, where w is the weight assigned to the edge. In some implementations, $e_1$ may include at least a portion of payload 17 (e.g., the token), and $e_2$ may include at least a portion of the second payload (e.g., the token shared with payload 17).

In some implementations, at least the second payload of the above-noted portion (of the plurality of payloads that shares a structural overlap with payload 17) may be prevented 308 by test process 10 from being sent to computer 12 in response to test process 10 identifying 306 that the second payload shares the structural overlap with payload 17. In some implementations, preventing 308 at least the second payload of the portion from being sent to computer 12 may include test process 10 adjusting 314 a priority of at least the second payload. For instance, continuing with the above example and, e.g., during testing, propagation graph 500 may via test process 10 provide at the start of each round the next payload to send to computer 12. In some implementations, test process 10 may use a "greedy" algorithm of selecting the payload with the highest priority. After response 19 is received 302 for the sent 300 payload 17 and the above-described structural constraints are learned (e.g., a constraint stating that the "alert" substring is sanitized), the priorities of some or all payloads connected to the sent 300 payload 17 via the edges corresponding to the learned constraint (e.g., the "alert" terminal) may be adjusted 314. For example, the adjustment rate may be proportional to the edge weight (w). In some implementations, the priority of the sent 300 payload 17 may be adjusted to, e.g., 0, to ensure that payload 17 is not sent again to computer 12.

Generally explained another way, if test process 10 learns that, based at least in part on $e_1$, that t is (e.g., likely) sanitized by web application 21 (e.g., based upon response 19 received 302 by test process 10 for $e_1$ t is sanitized), then test process 10 may adjust 314 (e.g., lower) the priority of sending $e_2$ by a measure that is proportional to w. The example propagation graph 500 illustrates the connection between $e_1$ and $e_2$ via t.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computing system including a processor and a memory configured to perform operations comprising:
    defining a collection of constraints to which an application must conform for a test in a set of test, the set of test including a plurality of payloads;
    defining a collection of constraints to which the application conforms;
    defining a collection of constraints to which the application does not conform;
    sending, by a first computing device, a payload from the plurality of payloads to a second computing device, wherein sending the payload is in response to determining that a constraint in the collection of constraints to which the application must conform for the test is not in the collection of constraints to which the application does not conform;
    receiving, at the first computing device, a response from the second computing device responding to the payload;
    determining that the payload has successfully attacked the application executing at the second computing device based upon, at least in part, the response;
    identifying at least a portion of the plurality of payloads that shares a structural overlap with the first payload; and
    preventing at least a second payload of the portion from being sent to the second computing device in response to identifying that the second payload shares the structural overlap with the first payload, including adjusting a priority of at least the second payload.

2. The computing system of claim 1 wherein the structural overlap includes a token.

3. The computing system of claim 1 further comprising selecting a grammar for generating the plurality of payloads.

4. The computing system of claim 1 further comprising generating a data structure to model the structural overlap of at least the second payload with the first payload.

5. The computing system of claim 4 wherein the data structure includes a weighted edge label associated with the structural overlap of at least the second payload with the first payload.

6. The computing system of claim 1 wherein the successful attack includes a cross-site scripting attack.

7. A computer program product residing on a non-transitory computer readable storage medium having a plurality of instructions stored thereon which, when executed by a processor, cause the processor to perform operations comprising:
    defining a collection of constraints to which an application must conform for a test in a set of test, the set of test including a plurality of payloads;
    defining a collection of constraints to which the application conforms;
    defining a collection of constraints to which the application does not conform;
    sending, by a first computing device, a payload from the plurality of payloads to a second computing device, wherein sending the payload is in response to determining that a constraint in the collection of constraints to which the application must conform for the test is not in the collection of constraints to which the application does not conform;
    receiving, at the first computing device, a response from the second computing device responding to the payload;

determining that the payload has successfully attacked the application executing at the second computing device based upon, at least in part, the response;

identifying at least a portion of the plurality of payloads that shares a structural overlap with the first payload; and preventing at least a second payload of the portion from being sent to the second computing device in response to identifying that the second payload shares the structural overlap with the first payload, including adjusting a priority of at least the second payload.

8. The computer program product of claim 7 wherein the structural overlap includes a token.

9. The computer program product of claim 7 further comprising selecting a grammar for generating the plurality of payloads.

10. The computer program product of claim 7 further comprising generating a data structure to model the structural overlap of at least the second payload with the first payload.

11. The computer program product of claim 10 wherein the data structure includes a weighted edge label associated with the structural overlap of at least the second payload with the first payload.

12. The computer program product of claim 7 wherein the successful attack includes a cross-site scripting attack.

\* \* \* \* \*